(12) United States Patent
Tsuji

(10) Patent No.: US 6,516,333 B1
(45) Date of Patent: Feb. 4, 2003

(54) STICKY BIT VALUE PREDICTING CIRCUIT

(75) Inventor: Masayuki Tsuji, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/468,852

(22) Filed: Dec. 21, 1999

(30) Foreign Application Priority Data

Dec. 25, 1998 (JP) .......................................... 10-370437

(51) Int. Cl.⁷ ................................................ G06F 7/38
(52) U.S. Cl. ...................................................... 708/499
(58) Field of Search .......................... 708/499, 550–553

(56) References Cited

U.S. PATENT DOCUMENTS

| | | | |
|---|---|---|---|
| 4,928,259 A | 5/1990 | Galbi et al. | .................. 364/745 |
| H1222 H * | 8/1993 | Brown et al. | ............... 708/499 |
| 5,260,889 A * | 11/1993 | Palaniswami | ............... 708/499 |
| 5,341,319 A | 8/1994 | Madden et al. | |
| 5,867,722 A * | 2/1999 | Whitted et al. | ............. 708/620 |
| 5,944,773 A | 8/1999 | Chao et al. | |
| 6,044,391 A * | 3/2000 | Chao et al. | .................. 708/499 |

FOREIGN PATENT DOCUMENTS

EP        0 655 675 A1      5/1995        ............. G06F/5/01

\* cited by examiner

*Primary Examiner*—David H. Malzahn
(74) *Attorney, Agent, or Firm*—Staas & Halsey LLP

(57) ABSTRACT

A sticky bit value of the product of mantissas X and Y is predicted by a circuit that comprises a bit pattern generation circuit 25A that generates a bit pattern B, based on a trailing zero bit pattern of the multiplier Y, having all values of the sticky bit S corresponding to any number C of the trailing 0s of the multiplicand X; a priority encoder 21 for providing the number C depending on X; and a sticky bit selection circuit 26A for selecting one bit in the bit pattern B as a value of the sticky bit S depending on the value C.

10 Claims, 10 Drawing Sheets

FIG.3

| D\B | B7 | B6 | B5 | B4 | B3 | B2 | B1 | B0 |
|---|---|---|---|---|---|---|---|---|
| 0 | 1 | 1 | 1 | 1 | 1 | 1 | 0 | 0 |
| 1 | 1 | 1 | 1 | 1 | 1 | 0 | 0 | 0 |
| 2 | 1 | 1 | 1 | 1 | 0 | 0 | 0 | 0 |
| 3 | 1 | 1 | 1 | 0 | 0 | 0 | 0 | 0 |
| 4 | 1 | 1 | 0 | 0 | 0 | 0 | 0 | 0 |
| 5 | 1 | 0 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |

↑ C=0, ↑ C=1, ↑ C=2, ↑ C=3, ↑ C=4, ↑ C=5, ↑ C=6, ↑ C=7

STICKY BIT VALUE PREDICTING CIRCUIT

BACKGROUND OF THE INVENTION

1. Field of the Invention

The present invention relates to a sticky bit value predicting circuit for use in a multiplication circuit.

2. Description of the Related Art

FIG. 9 shows a prior art mantissa multiplication circuit.

A product of a multiplicand X and a multiplier Y is calculated in a multiplier 10, the circuit is provided with, for example, a Wallace tree and a Booth recorder for a high speed processing. The multiplicand X and the multiplier Y each have '1' as a value of the most significant bit (MSB) and are normalized so as to respectively be $1 \leq X < 2$ and $1 \leq Y < 2$. The product Z is rounded in a rounding circuit 11 and a product ZH' is obtained.

FIG. 10 is an illustration a sticky bit used in a rounding operation in a case where a multiplicand and a multiplier each are 8 bits and the product is 16 bits.

Since $1 \leq Z < 4$, the integral part of the product Z having bits Z15 to Z0 is comprised of higher-order two bits Z15 and Z14, wherein Z15='1' or Z14='1.'

Denoting higher-order 8 bits of the product Z as ZH normalized as MSB='1' before rounding, in a case where Z15 ='0' and Z14='1', ZH is expressed as Z14 to Z7, and therefor the least significant bit (LSB) is Z7 and a round bit R is Z6. The sticky bit S is "1" when any one of Z5 to Z0 bits is '1,' or else the sticky bit S is "0." A rounding operation on the product ZH is performed using the round bit R and the sticky bit S according to the IEEE (The Institute of Electrical and Electronic Engineers, Inc.) Binary Floating-Point Standard 754, and the result is Z'=ZH or Z'=ZH+1.

In a case where Z15='1,' the product Z is right-shifted by one bit to normalize. Using Z15 to Z0 before this shifting, the LSB of the product ZH is Z8 and the round bit is Z7. The OR of Z7 and the provisional sticky bit S obtained before the shift is performed to obtain an actual sticky bit S.

If the sticky bit S is obtained with OR gates 12 to 16 after the product Z is obtained, it takes a long time to obtain a rounded product ZH'.

Considering such circumstances, U.S. Pat. No. 4,928,259 has provided a sticky bit value predicting circuit 20 shown in FIG. 9, whereby the sticky bit S is obtained in parallel with a multiplication operation.

Referring back to FIG. 10, the number M of trailing 0s is equal to the sum of the number C of trailing 0s of the multiplicand X and the number D of trailing 0s of the multiplier Y. For example as shown in FIG. 10, in a case where C=2 and D=3, then M=5. In a case where $M \geq 6$, then S='0,' and in a case where M<6, then S='1.'

Referring back to FIG. 9, in the sticky bit value predicting circuit 20, the numbers C and D of trailing 0s of the multiplicand X and the multiplier Y are obtained in priority encoders (trailing zero encoders) 21 and 22, respectively, the sum M of the numbers C and D of the trailing 0s are calculated in an adder 23, and M is compared with a predetermined value CONST in a comparator 24, thereby obtaining the sticky bit S as a result.

However, circuit scales of the priority encoders 21 and 22 are comparatively large. As described in U.S. Pat. No. 4,928,259, a priority encoder of 5 bits comprises thirteen encoders 21 of 4 bits provided at a first stage, three encoders 21 of 4 bits and three multiplexers with 4 inputs provided at a second stage, and one encoder 21 of 4 bits and one multiplexer with 4 inputs provided at a third stage.

SUMMARY OF THE INVENTION

Accordingly, it is an object according to the present invention to provide a sticky bit value predicting circuit with a simpler configuration and a semiconductor device provided with the same.

In the present invention, there is provided a sticky bit value predicting circuit for predicting a sticky bit value of a product of a first mantissa and a second mantissa, comprising: a bit pattern generation circuit for generating a bit pattern of sticky bit values for any number of trailing 0s of the second mantissa on the basis of a trailing zero bit pattern of the first mantissa; a priority encoder for providing a selection control value, corresponding to a bit position of '1' whose priority is higher with lower order bit side, in response to the second mantissa; and a sticky bit selection circuit for selecting one bit from the generated bit pattern as a sticky bit value depending on the selection control value.

With the present invention, since a bit pattern generation circuit and a sticky bit selection circuit each with a simpler configuration are employed instead of a prior art configuration including priority encoders, an adder and a comparator, a configuration of the sticky bit value predicting circuit becomes simpler as a whole, which in turn makes the circuit scale smaller than a prior art one.

Other aspects, objects, and the advantages of the present invention will become apparent from the following detailed description taken in connection with the accompanying drawings.

BRIEF DESCRIPTION OF THE DRAWINGS

FIG. 3 is an illustration of a bit pattern B corresponding to each of the numbers D=0 to 7 of trailing 0s of a multiplier Y in a case where the bit numbers of a multiplicand X and the multiplier Y each are 8 bits;

DESCRIPTION OF THE PREFERRED EMBODIMENTS

Figure 1:
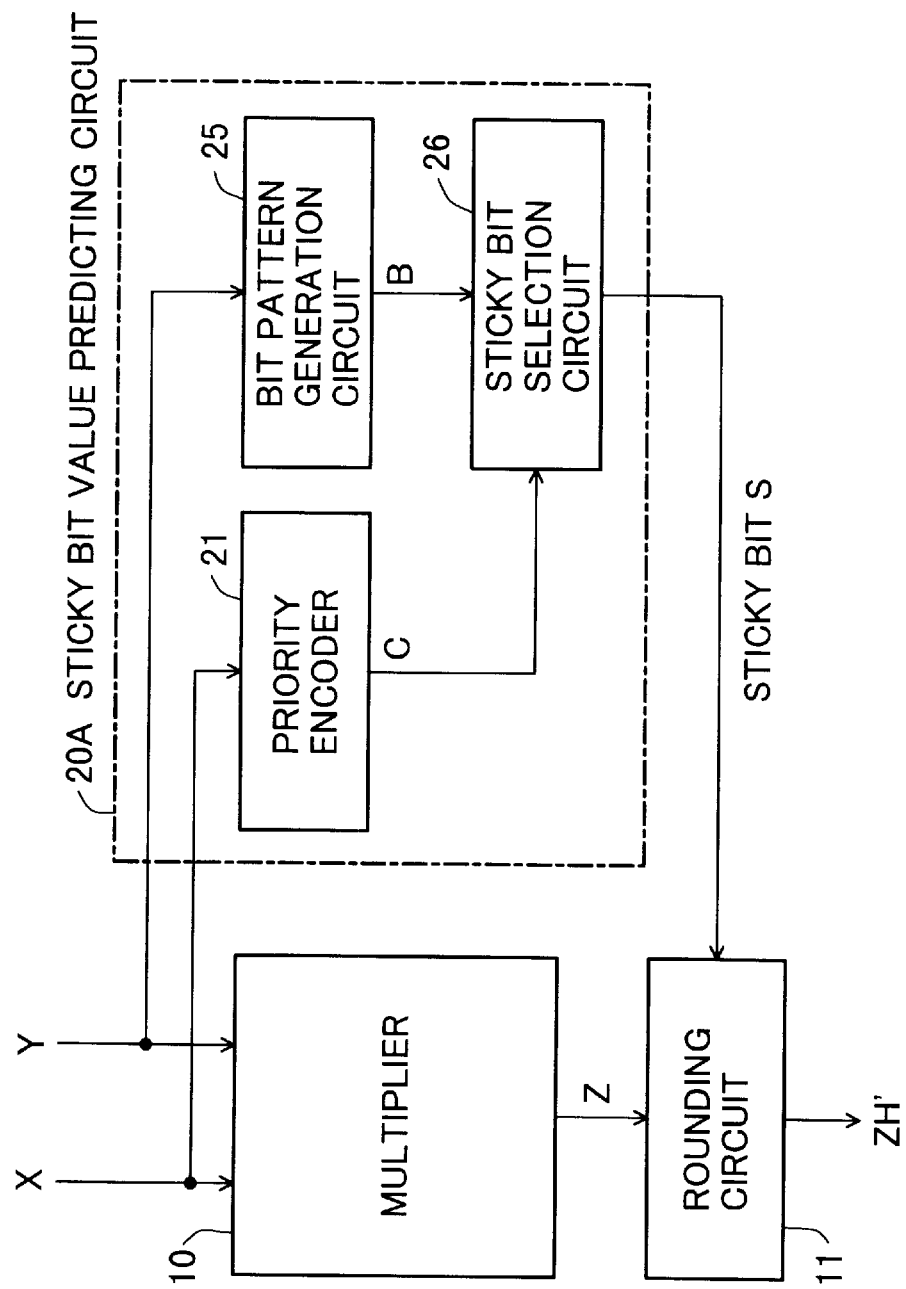
FIG. 1 is a schematic block diagram showing a mantissa multiplication circuit of a first embodiment according to the present invention.

Referring now to the drawings, wherein like reference characters designate like or corresponding parts throughout several views, preferred embodiments of the present invention are described below.

First Embodiment

FIG. 1 is a schematic block diagram showing a mantissa multiplication circuit of the first embodiment according to the present invention.

The circuit is employed in a semiconductor device such as a processor.

Figure 8:
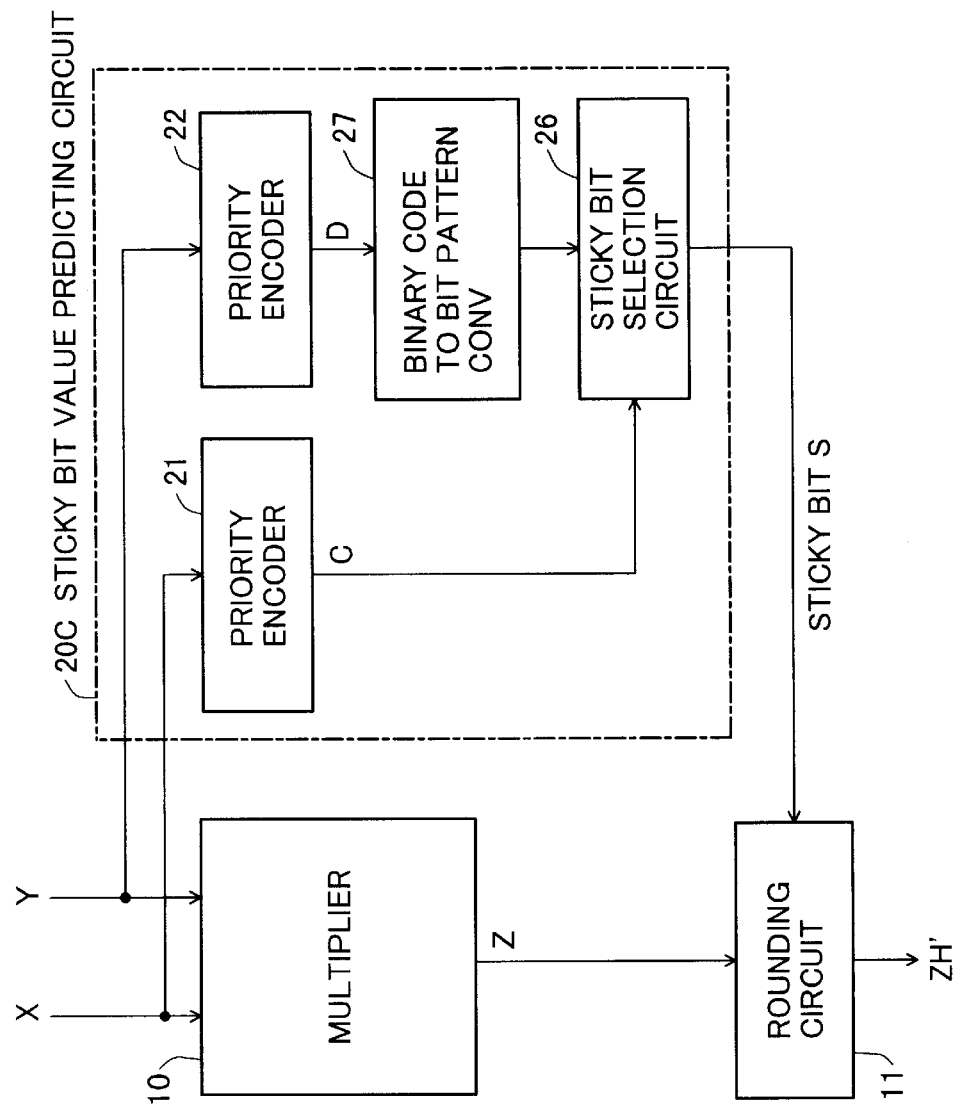
FIG. 8 is a block diagram showing a mantissa multiplication circuit of a fifth embodiment according to the present invention.

In the circuit, a sticky bit value predicting circuit 20A is used instead of the sticky bit value predicting circuit 20 in FIG. 8. In the circuit 20A, a multiplicand X and a multiplier Y are respectively provided to a priority encoder 21 and a bit pattern generation circuit 25. The priority encoder 21 obtains a value C corresponding to a bit position of '1' whose priority is higher with lower order bit side of the multiplicand X. For example, the value C is equal to the number of trailing 0s. The bit pattern generation circuit 25 generates a bit pattern B, based on a trailing zero bit pattern of the multiplier Y, having all values of the sticky bit S corresponding to any number C of the trailing 0s of the multiplicand X. That is, in parallel with processing of the priority encoder 21, a bit pattern B is obtained based on a trailing zero bit pattern of the multiplier Y and the bit pattern B is a sticky bit value pattern having any value corresponding to any output value C of the priority encoder 21.

The bit pattern B and the number C of trailing 0s are respectively provided to the data input and control input of a sticky bit selection circuit 26, respectively. The sticky bit selection circuit 26 selects one bit in the bit pattern B as a value of the sticky bit S depending on the value C.

Figure 2:
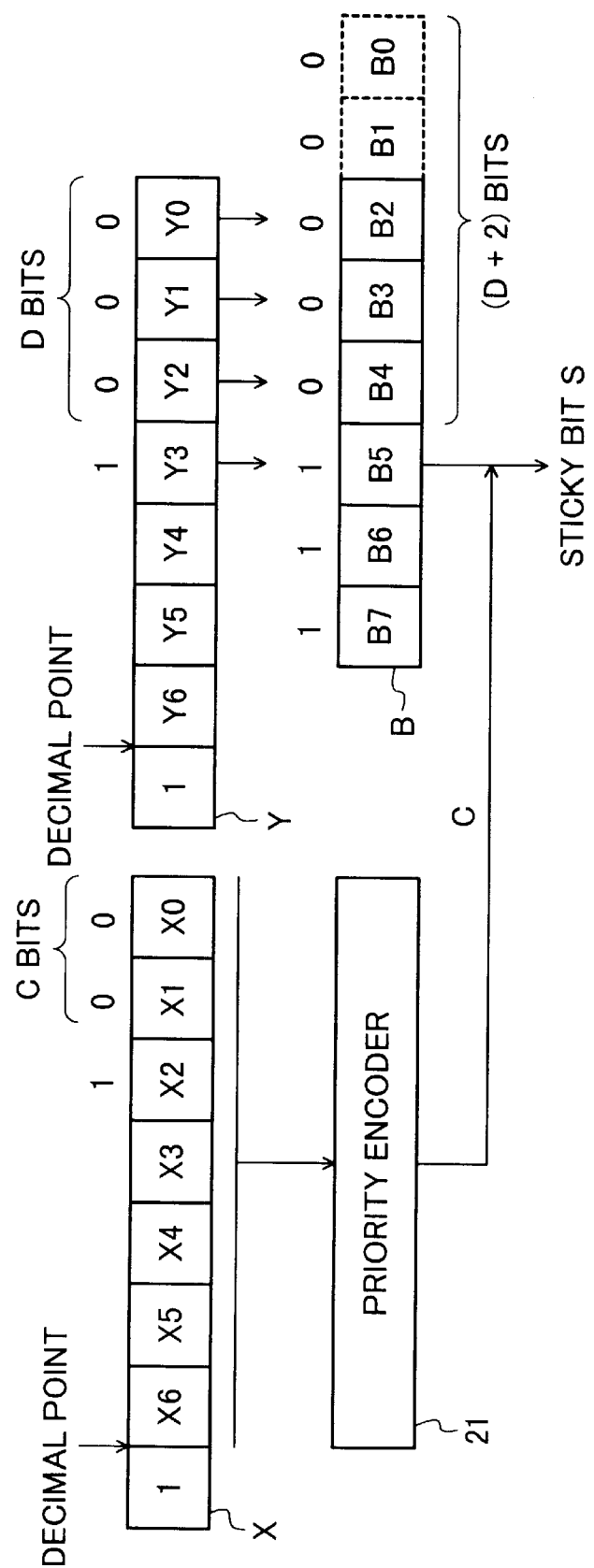
FIG. 2 is an illustration of operations of the sticky bit value predicting circuit in FIG. 1.

FIG. 2 is an illustration of operations of the sticky bit value predicting circuit 20A in FIG. 1.

Figure 10:
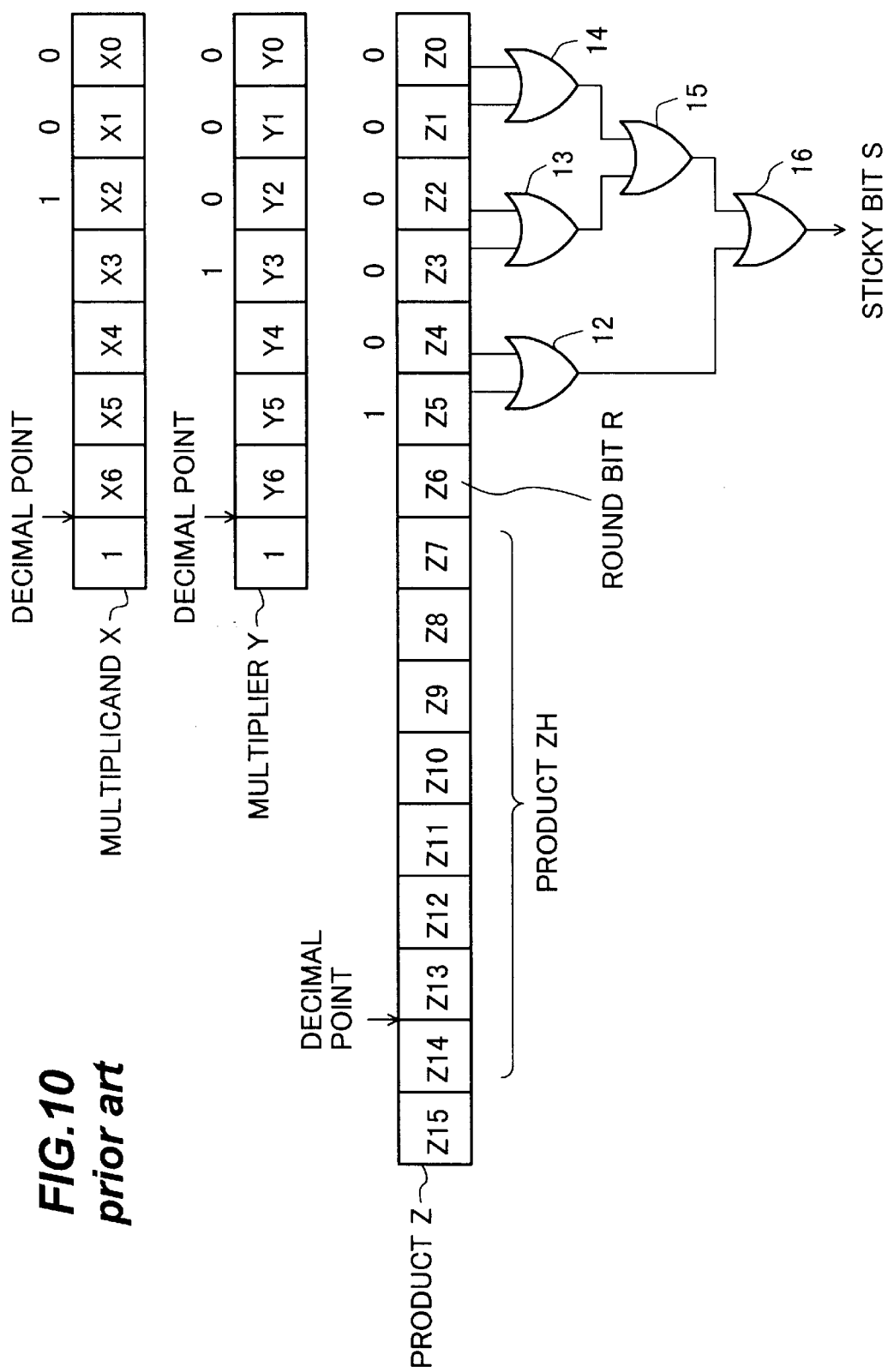
FIG. 10 is an illustration of operations to obtain a sticky bit used in a rounding operation.

For simplicity, a case is considered in which, as in FIG. 10, the multiplicand X and the multiplier Y are both of 8 bits. A way of normalization of the multiplicand X and the multiplier Y and the position of a decimal point are same as in the case of FIG. 10.

A bit pattern B is composed of 8 bits of B7 to B0. The lower-order two bits B1 and B0 are both fixed at '0s.' Bits of B7 to B2 respectively correspond to multiplier Y bits of Y5 to Y0. The number of trailing 0s of a pattern having B7 to B2 is same as that of the multiplier Y, and the higher order bits than the trailing 0s of that pattern are all "1." For example as shown in FIG. 2, since Y2 to Y0 are all '0,' B4 to B2 corresponding to the bits Y2 and Y0 are also all '0.' Further, since Y3 is the first '1' from the lower-order bit side, B7 to B5 are all '1.'

In the case of FIG. 2, The sticky bit S is '1' if the number C of trailing 0s of the multiplicand X is 2 or less, and the sticky bit S is '0' if the number C of the trailing 0s is 3 or more. In a case where C=0, that is X0='1,' the first bit B7 of a bit pattern B from the MSB is selected as a value of the sticky bit S. In a case where C=1, that is X0='0,' and X1='1,' then the second bit B6 is selected as a value of the sticky bit S. In a case where C=2, that is X0='0,' X1='0' and X2='1,' then the third bit B5 is selected as a value of the sticky bit S. In cases where $3 \leq C \leq 6$, a value of the sticky bit S is selected in a similar way of the above described. In a case where Y6='0,' then B='00000000' and S='0' regardless of a value of C.

When the lower-order D bits of Y is all '0,' the lower-order (D+2) bits of a bit pattern B are all '0'. Since B is of 8 bits, if the (C+1)-th bit from MSB of a bit pattern B is selected as a value of the sticky bit S, when (C+1)+(D+2) $\geq 9$, that is C+D $\geq 6$, then S='0,' and when (C+1)+(D+2) $\leq 8$, that is C+D $\leq 5$, then S='1.'

In a case where the multiplicand X and the multiplier Y each are of n bits, the lower-order (D+2) bits of a bit pattern B are all '0' and B is of n bits. If the (C+1)-th bit from MSB of a bit pattern B is selected as a value of the sticky bit S, when (C+1)+(D+2) $\geq n+1$, that is C+D $\geq n-2$, then S='0,' and when (C+1)+(D+2) $\leq n$, that is C+D $\leq n-3$, then S='1.'

FIG. 3 shows bit patterns of Bs for D=0 to 7 each in a case where the numbers of bits of a multiplicand X and the multiplier Y each are 8 bits.

Figure 4:
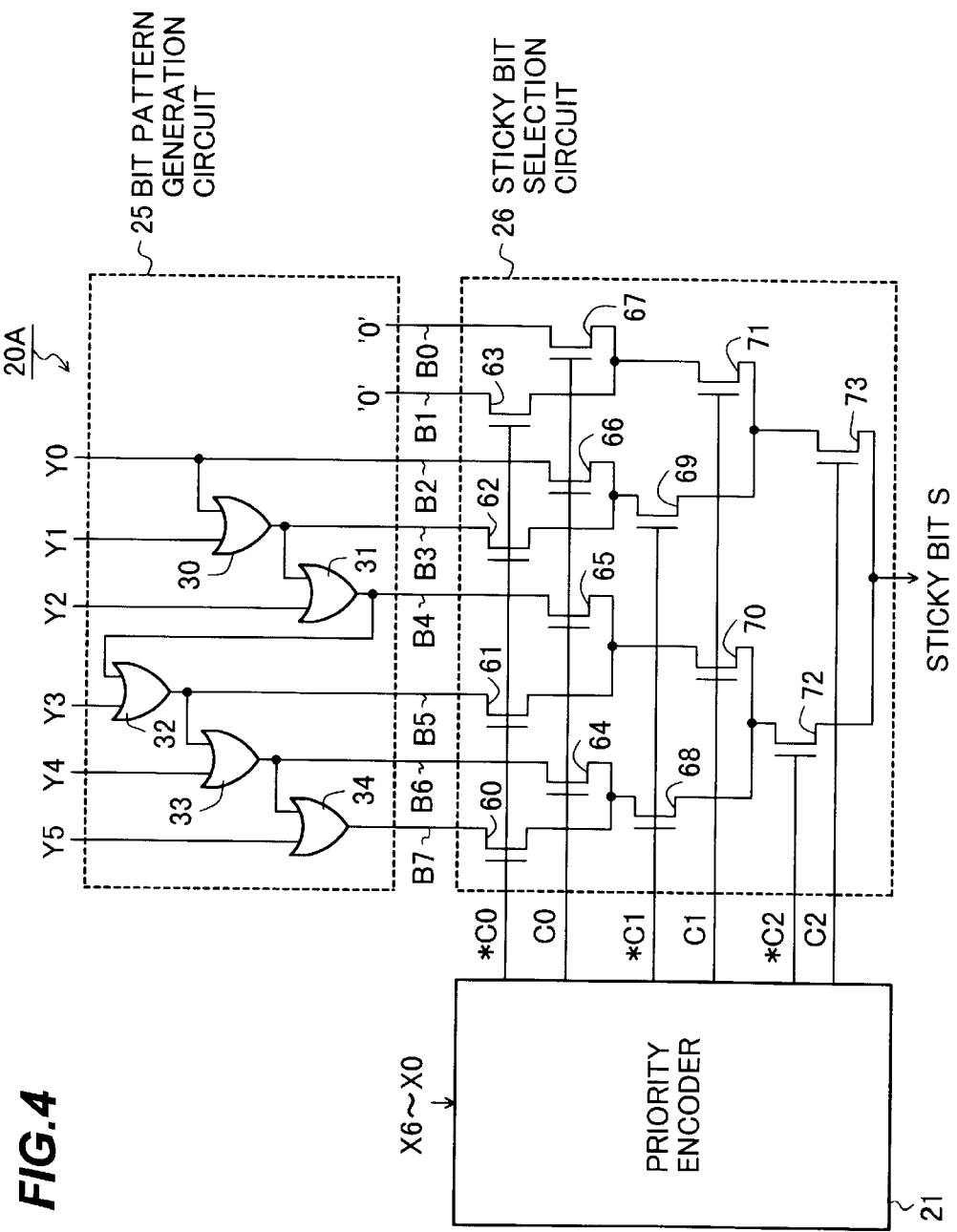
FIG. 4 is a diagram showing a sticky bit value predicting circuit in FIG. 1 in a case where the bit numbers of the multiplicand X and the multiplier Y each are 8 bits.

FIG. 4 shows an embodiment of the sticky bit value predicting circuit 20A in a case where the numbers of bits of the multiplicand X and the multiplier Y each are 8 bits.

In a bit pattern generation circuit 25, Y1 to Y5 are respectively provided to one input of OR gates 30 to 34, and Y0 and outputs of the OR gates 30 to 33 are respectively provided to the other input of the OR gates 30 to 34. B2 is same as Y0, and B3 to B7 are respectively outputs of the OR gates 30 to 34. B0 and B1 are, for example, lines at a grounded potential.

For example, when Y0 and Y1 each are '0', and Y2 is '1,' B2 and B3 each are '0' and B4 to B7 each are '1.'

Since a sticky bit selection circuit 26 select a bit pattern B depending on the output of the priority encoder 21 in a tournament selection, NMOS transistors 60 to 73 as switching transistors are connected in a tree structure.

Outputs C of the priority encoder 21 is comprised of bits C2 to C0 and the respective complementary bits *C2 to *C0 thereof. When C0='0,' the transistors 60 to 63 are on and the transistors 64 to 67 are off, while when C0='1,' the transistors 60 to 63 are off and the transistors 64 to 67 are on. Likewise, when C1='0,' the transistors 68 and 69 are on and the transistors 70 and 71 are off, and when C2='0,' the transistor 72 is on and the transistor 73 is off.

In such a way, all the transistors of the sticky bit selection circuit 26 are on/off controlled at the same time and therefore, an operation is performed at a high speed.

For example, when C='000', since the transistors 60 to 63, 68, 69 and 72 are on and the other transistors are off, B7 is selected as the value of the sticky bit S. When C='011', since the transistors 64 to 67, 70, 71 and 72 are on and the other transistors are off, B4 is selected as the value of the sticky bit S.

In such a way, the value of the sticky bit S is determined.

Figure 9:
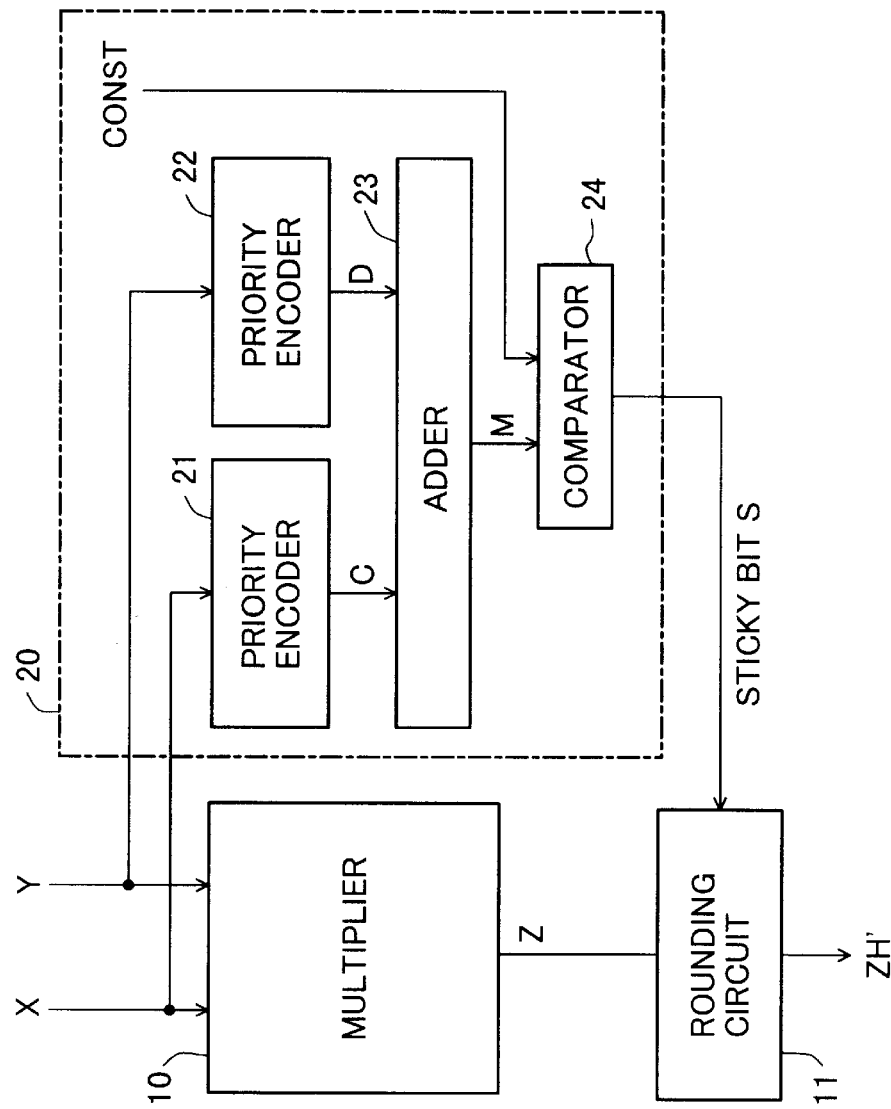
FIG. 9 is a block diagram showing a prior art mantissa multiplication circuit.

According to the first embodiment, instead of the priority encoder circuit 22, the adder 23 and the comparator 24 in FIG. 9, the bit pattern generation circuit 25 and the sticky bit selection circuit 26 each with a simpler configuration are used and therefore, the configuration of the sticky bit value predicting circuit 20A is simpler, thus enabling the circuit scale to be smaller than the prior art configuration.

Second Embodiment

Figure 5:
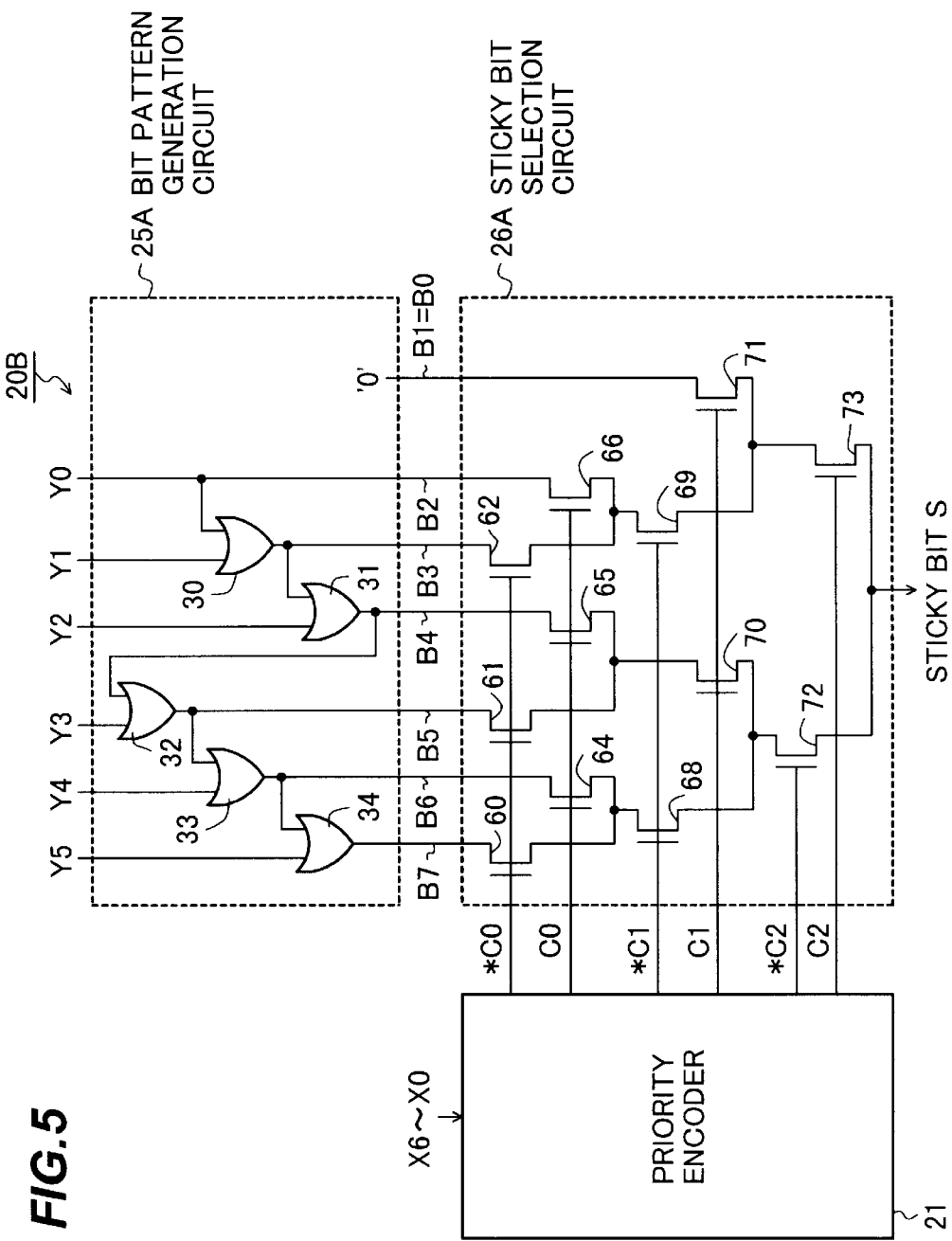
FIG. 5 is a diagram showing a sticky bit value predicting circuit, corresponding to FIG. 4, of a second embodiment according to the present invention.

FIG. 5 shows a sticky bit value predicting circuit 20B, corresponding to FIG. 4, of the second embodiment according to the present invention.

In the sticky bit selection circuit 26 of FIG. 4, '0' is always selected when either of the transistors 63 and 67 is on and the transistors 71 and 73 are both on, and therefore, the transistors 63 and 67 can be omitted. Hence, in the sticky bit selection circuit 26A of FIG. 5, the transistors 63 and 67 are not used, and '0' is provided to the input of the transistor 71. This '0' corresponds to B1 and B0, and the output of the bit pattern generation circuit 25A is of 7 bits and one bit less than in the case of FIG. 4.

The other points are same as those in the sticky bit value predicting circuit 20A of FIG. 4.

Third Embodiment

Figure 6:
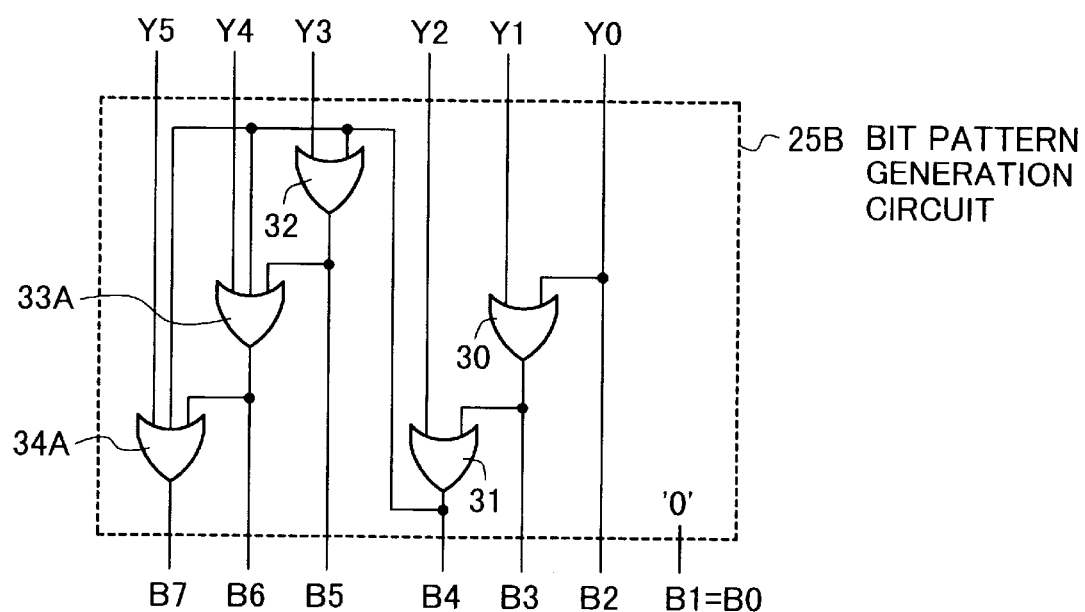
FIG. 6 is a diagram showing a bit pattern generation circuit of a third embodiment according to the present invention.

FIG. 6 shows a bit pattern generation circuit 25B of the third embodiment according to the present invention.

In the circuit, the output of an OR gate 31 is provided to not only the OR gate 32 but also OR gates 33A and 34A and thereby, the settling time of the output of the bit pattern generation circuit 25B is reduced. It takes the longest settling time in a case where Y5 to Y1 each are '0' and Y0 is '1.' In the case, the output of the OR gate 30 becomes '1' after Y0='1', this output is provided to the OR gate 31 and the output of the OR gate 31 becomes '1'. Then, the output of the OR gate 31 is simultaneously provided to the OR gates 32, 33A and 34A and each of the outputs therefrom becomes '1'.

The other points are same as those in the case of the second embodiment.

Fourth Embodiment

Figure 7:
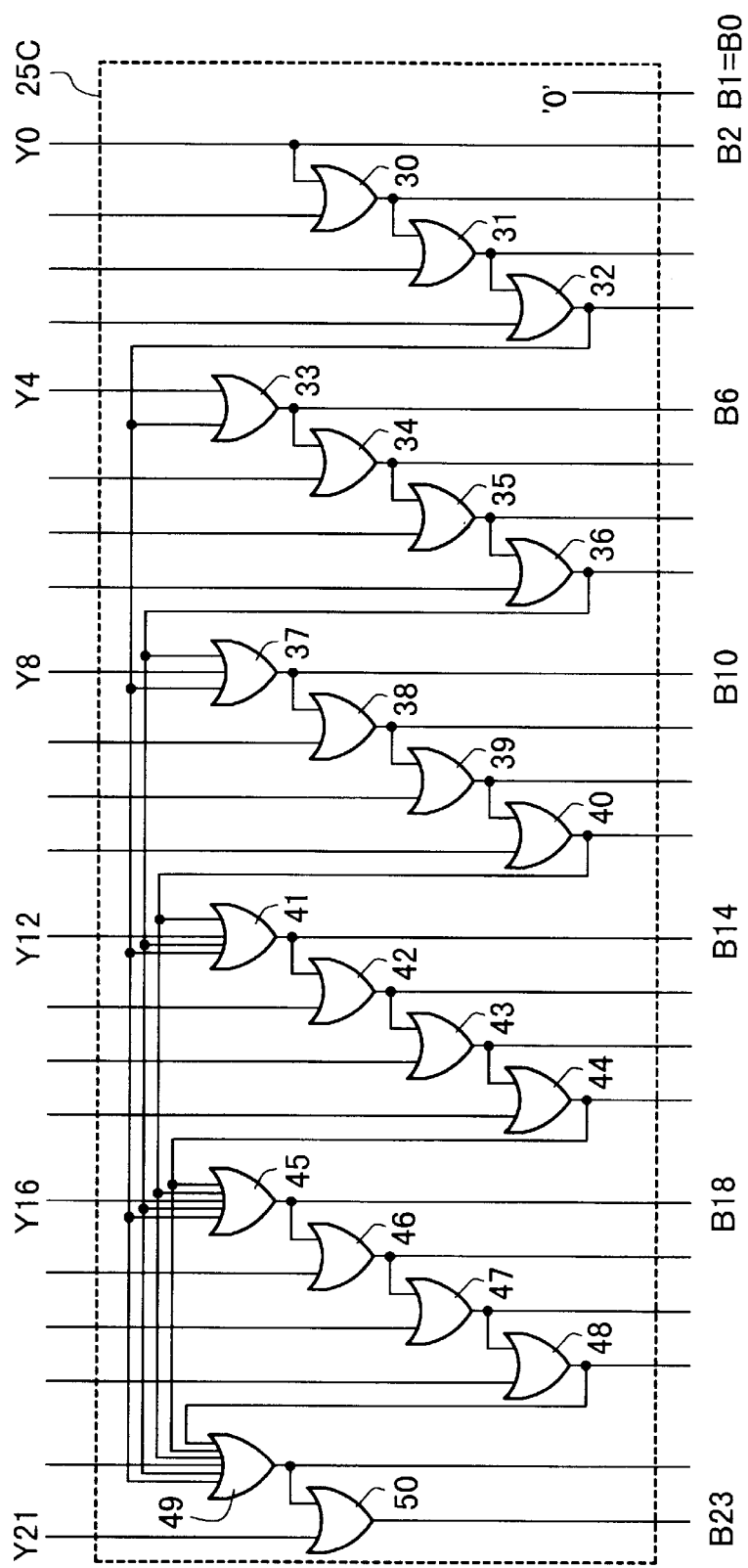
FIG. 7 is a diagram showing a bit pattern generation circuit of a fourth embodiment according to the present invention.

FIG. 7 shows a bit pattern generation circuit 25C of the fourth embodiment according to the present invention.

In this embodiment, the multiplier Y is of 24 bits and the lower-order 22 bits Y21 to Y0 are provided to the bit pattern generation circuit 25C. The circuit 25C is provided with OR gates 30 to 50 and connected similar to FIG. 4. In order to realize a high-speed operation, the output of the OR gate 32 is provided to not only the OR gate 33 but also the OR gates 37, 41, 45 and 49. Likewise, the output of the OR gate 36 is provided to not only the OR gate 37 but also the OR gates 41, 45 and 49, and the output of the OR gate 40 is provided to not only the OR gate 41 but also the OR gates 45 and 49.

Such a circuit configuration is still simpler than the corresponding prior art encoder circuit.

Fifth Embodiment

FIG. 8 shows a configuration of a mantissa multiplication circuit of the fifth embodiment according to the present invention.

A sticky bit value predicting circuit 20C employs a priority encoder 22 and a binary code to bit pattern conversion circuit 27 instead of the bit pattern generation circuit 25 in FIG. 1. The priority encoder 22 obtains the number D of trailing 0s of the multiplier Y and provides the number D to the binary code to bit pattern conversion circuit 27. The circuit 27 is a logic circuit and outputs, for example in a case of a 8 bit multiplicand Y, a bit pattern B in one row in FIG. 3 depending on the number D, and provides to the sticky bit selection circuit 26.

The other points are same as those of the first embodiment.

In the fifth embodiment, although a configuration is more complicated than those of the first to fourth embodiments since the priority encoder 22 is employed. But, since the configurations of the binary code/bit pattern conversion circuit 27 and the sticky bit selection circuit 26 are comparatively simple, there is a case where the configuration of the circuit 20C is simpler than that of the sticky bit value predicting circuit 20 in FIG. 9.

Although preferred embodiments of the present invention has been described, it is to be understood that the invention is not limited thereto and that various changes and modifications may be made without departing from the spirit and scope of the invention.

For example, in FIG. 1, one of the multiplicand X and the multiplier Y may be provided to the priority encoder 21 and the other thereof to the bit pattern generation circuit 25, namely the multiplicand X and the multiplier Y may be exchanged.

Further, though not in general, the multiplicand X and the multiplier Y are of n bits and a product Z may be of m bits (m<n) and in this case, (n−m) bits are added to the MSB side of the bit pattern B of FIG. 2.

Further, in a case where the multiplicand and the multiplier are both 8 bits as shown in FIG. 10, since only the lower-order 6 bits are required to be considered to obtain a sticky bit, in FIG. 2 only the lower-order 6 bits, that is X0 to X5, are necessary to be inputted to the priority encoder 21 and in this case, the bit B0 is not necessary.

For example, in FIG. 4, a configuration may be adopted in which a two-input AND gate is employed instead of each transistor in the sticky bit selection circuit 26, and one of the outputs of the priority encoder 21 is provided to one input of the AND gate.

In addition, a case may also be adopted in which an output of the priority encoder 21 is not of the number C of trailing 0s but of the number (C+1) of bits having a bit '1' and adjacent trailing 0s. In this case, a dummy bit '1' may be added to MSB side of the bit pattern B, or a sticky bit selection circuit may be structured in such a way that when the number is (C+1), the same bit from the bit pattern B is selected as in the case of the number of trailing 0s is C.

Further, the priority encoder 21 may be structured to output, for example, '00001000' when an input is '10011000.' Namely, only the first bit '1' from the lower-order bit side is '1' and each of the other bits is '0' is outputted, instead of the number C of trailing 0s, as a value corresponding to a bit position of '1' whose priority is higher with lower order bit side. The structural example of this priority encoder is such that it has a first circuit same as FIG. 6 for providing, for example, '11111000' when the input thereof is above-described '10011000'; and a second circuit for operating an exclusive OR on each adjacent two output bits of the first circuit. With this structure, the sticky bit selection circuit may be structured such that it has only transistor switches of one stage connected to respective output bits of the bit pattern generation circuit and the control inputs of the transistors are connected to respective output bits of the second circuit. This sticky bit selection circuit has a simple structure.

What is claimed is:

1. A sticky bit value predicting circuit to predict a sticky bit value of a product of a first mantissa and a second mantissa, comprising:
   a bit pattern generation circuit to generate a bit pattern of sticky bit values for any number of trailing 0s of said second mantissa on the basis of a trailing zero bit pattern of said first mantissa;
   a priority encoder to provide a selection control value corresponding to the number of trailing 0s of said second mantissa; and
   a sticky bit selection circuit to select one bit from said generated bit pattern as a sticky bit value depending on said selection control value.

2. A sticky bit value predicting circuit according to claim 1, wherein said bit pattern generation circuit generates said bit pattern in which at least the lower-order i bits each are of '0,' where i indicates the number of trailing 0s of said first mantissa, and all the rest bits each are of '1.'

3. A sticky bit value predicting circuit according to claim 2, wherein said bit pattern generation circuit generates said bit pattern having a bit of fixed '0' as LSB.

4. A sticky bit value predicting circuit according to claim 3, wherein when said first and second mantissas each have n bits, said generated bit pattern has essentially n bits and lower-order 2 bits of said generated bit pattern each are of fixed '0.'

5. A sticky bit value predicting circuit according to claim 3, wherein said bit pattern generation circuit generates said bit pattern of n bits, an i-th order bit value of which is equal to a logic OR of an i-th order bit of said first mantissa and an (i+1)-th order bit of said generated bit pattern, where i-th order is from MSB side and i is any integer in the range of $1 \leq i \leq n-1$.

6. A sticky bit value predicting circuit according to claim 5, wherein said bit pattern generation circuit comprises a logic gate to provide an i-th order bit of said generation bit pattern, said logic gate receives a k-th order bit of said generation bit pattern, where k is an integer in the range of $(i+1) \leq k \leq n$.

7. A sticky bit value predicting circuit according to claim 3, wherein said sticky bit selection circuit selects a (j+1)-th bit from MSB side of said generated bit pattern as a sticky bit value, where j is equal to the number of trailing 0s of said second mantissa.

8. A sticky bit value predicting circuit according to claim 7, wherein said sticky bit selection circuit selects said fixed '0' when said j is equal to or less by one than the maximum value.

9. A sticky bit value predicting circuit to predict a sticky bit value of a product of a first mantissa and a second mantissa, comprising:

a first priority encoder to provide a first value corresponding to a number of trailing 0s of said first mantissa;

a second priority encoder to provide a second value corresponding to a number of trailing 0s of said second mantissa;

a code to bit pattern conversion circuit to convert said second value to a bit pattern of sticky bit values for any one of said first value; and a sticky bit selection circuit to select one bit from said bit pattern as a sticky bit value depending on said first value.

10. A semiconductor device having a chip on which a sticky bit value predicting circuit is formed, said circuit to predict a sticky bit value of a product of a first mantissa and a second mantissa, said circuit comprising:

a bit pattern generation circuit to generate a bit pattern of sticky bit values for any number of trailing 0s of said second mantissa on the basis of a trailing zero bit pattern of said first mantissa;

a priority encoder to provide a selection control value corresponding to the number of trailing 0s of said second mantissa; and a sticky bit selection circuit to select one bit from said generated bit pattern as a sticky bit value depending on said selection control value.

* * * * *